United States Patent
Yoon et al.

(10) Patent No.: US 10,968,980 B2
(45) Date of Patent: Apr. 6, 2021

(54) LINEAR EXTENSION AND RETRACTION MECHANISM

(71) Applicant: LIFE ROBOTICS INC., Tokyo (JP)

(72) Inventors: Woo-Keun Yoon, Tokyo (JP); Daisuke Kanda, Tokyo (JP); Hiroaki Matsuda, Tokyo (JP)

(73) Assignee: LIFE ROBOTICS INC., Tokyo (JP)

( * ) Notice: Subject to any disclaimer, the term of this patent is extended or adjusted under 35 U.S.C. 154(b) by 342 days.

(21) Appl. No.: 16/198,914

(22) Filed: Nov. 23, 2018

(65) Prior Publication Data
US 2019/0093734 A1 Mar. 28, 2019

Related U.S. Application Data

(63) Continuation of application No. PCT/JP2017/018934, filed on May 19, 2017.

(30) Foreign Application Priority Data

May 31, 2016 (JP) .............................. JP2016-108401

(51) Int. Cl.
*F16G 13/20* (2006.01)
*B25J 18/02* (2006.01)
*F16H 19/06* (2006.01)

(52) U.S. Cl.
CPC .............. *F16G 13/20* (2013.01); *B25J 18/02* (2013.01); *B25J 18/025* (2013.01); *F16H 19/0636* (2013.01); *F16H 19/0663* (2013.01)

(58) Field of Classification Search
CPC ...... F16H 19/0663; F16H 19/04; F16H 19/02; F16H 19/0636; F16H 19/0645; B25J 18/02; B25J 17/0258; B25J 18/025; F16G 13/20
See application file for complete search history.

(56) References Cited

U.S. PATENT DOCUMENTS

2012/0024091 A1 2/2012 Kawabuchi et al.
2013/0068061 A1 3/2013 Yoon
(Continued)

FOREIGN PATENT DOCUMENTS

JP H5-277982 A 10/1993
JP H6-320472 A 11/1994
(Continued)

OTHER PUBLICATIONS

International Search Report issued in PCT/JP2017/018934 dated Jun. 27, 2017 with English Translation (6 pages).

*Primary Examiner* — Victor L MacArthur
(74) *Attorney, Agent, or Firm* — Nakanishi IP Associates, LLC

(57) ABSTRACT

A linear extension and retraction mechanism that is mounted in a robot arm mechanism includes: a plurality of first pieces having a flat plate shape which are bendably connected to each other at front and rear end faces; a plurality of second pieces having a groove shape which are bendably connected to each other at front and rear end faces of a bottom part, with the first and second pieces becoming linearly rigid when superposed, and the first and second pieces returning to a bent state when separated from each other; a head section which joins a leading first piece of the plurality of first pieces and a leading second piece of the plurality of second pieces; and a sending-out mechanism section including a plurality of rollers and for firmly superposing the first and second pieces and supporting the first and second pieces movably to front and rear. At least one groove section that extends from front to rear is formed in the surfaces of the first and second pieces that contact the rollers.

15 Claims, 14 Drawing Sheets

(56) References Cited

U.S. PATENT DOCUMENTS

2015/0343648 A1   12/2015   Yoon
2016/0375591 A1   12/2016   Yoon

FOREIGN PATENT DOCUMENTS

| JP | 5435679 B2 | 3/2014 |
|---|---|---|
| WO | 2010/070915 A1 | 6/2010 |
| WO | 2011/152265 A1 | 12/2011 |
| WO | 2015/137171 A1 | 9/2015 |

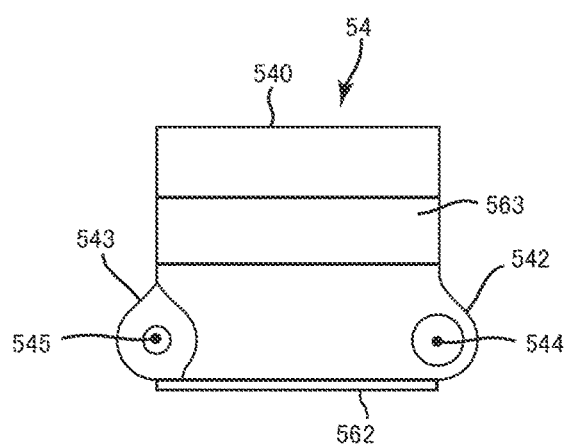
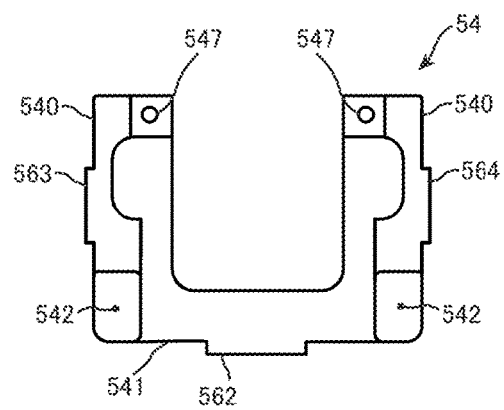
FIG.9A                FIG.9B
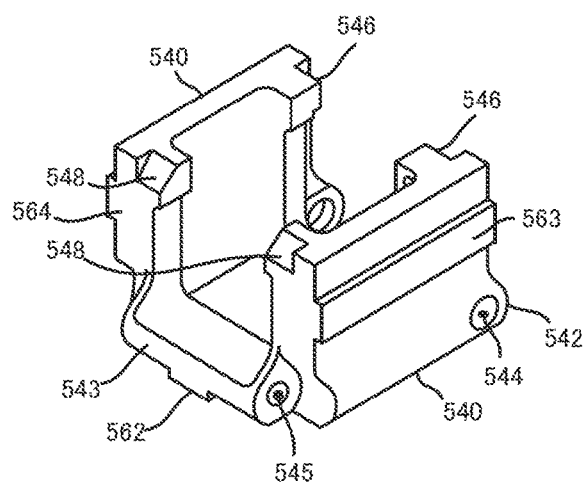
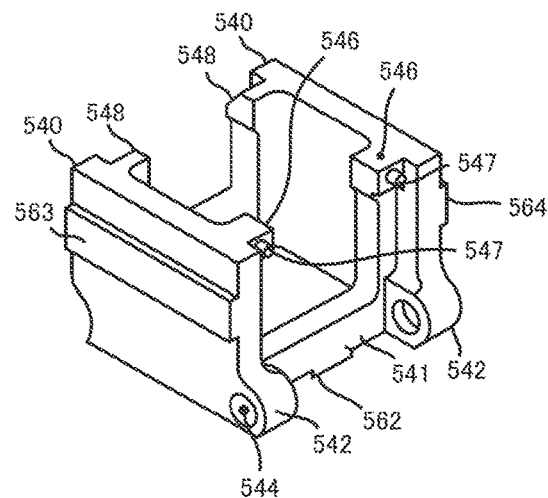
FIG.9C                FIG.9D

LINEAR EXTENSION AND RETRACTION MECHANISM

CROSS-REFERENCE TO RELATED APPLICATIONS

This application is continuation application of International Patent Application No. PCT/JP20171018934 filed on May 19, 2017, which is based upon and claims the benefit of priority from the prior Japanese Patent Application No. 2016-108401, filed May 31, 2016 the entire contents of which are incorporated herein by reference.

FIELD

Embodiments described herein relate generally to a linear extension and retraction mechanism.

BACKGROUND

Conventionally, articulated robot arm mechanisms are used in an industrial robot and various other fields. The present inventors developed a linear extension and retraction mechanism that can be applied to such kinds of articulated robot arm mechanisms (Patent Literature 1). Adoption of the linear extension and retraction joint in an articulated robot arm mechanism makes an elbow joint unnecessary, and can easily eliminate a singular point, and hence the linear extension and retraction joint is an extremely useful structure.

A linear extension and retraction mechanism includes a plurality of pieces made of metal that have a flat plate shape and which are bendably connected together (first pieces), and a plurality of pieces made of metal that have a groove shape which are bendably connected together at a bottom plate (second pieces). The first and second pieces are connected at the front ends thereof, and the first and second pieces are superposed when sent out in the forward direction, and a rigid state is thereby secured. By this means a columnar arm section having a certain rigidity is formed. The first and second pieces are separated when pulled back toward the rear, and thus the first and second pieces return to a bendable state and are housed inside a columnar support. A sending-out mechanism is equipped with a plurality of rollers on four faces of a frame having a rectangular cylinder shape, and realizes forward and rearward movement of the first and second pieces while firmly sandwiching the first and second pieces from four directions, and also supports the arm section in the upward, downward, left and right directions.

An end effector such as a hand is mounted at the tip of the arm section, and smooth forward and rearward linear movement of the arm section is required in order to realize high positional accuracy of the end effector. Therefore, high surface accuracy (surface roughness) is required for the respective surfaces on the top, bottom, left and right of each of the first and second pieces that contact rollers, and it is necessary to use expensive components as the first and second pieces.

CITATION LIST

Patent Literature

Patent Literature 1: Japanese Patent. No. 5435679

SUMMARY OF INVENTION

Technical Problem

An object of the present invention is to realize a reduction in the cost of a linear extension and retraction mechanism.

Solution to Problem

A linear extension and retraction mechanism according to the present embodiment includes: a plurality of first pieces having a flat plate shape which are bendably connected to each other at front and rear end faces; a plurality of second pieces having a groove shape which are bendably connected to each other at front and rear end faces of a bottom part, with the first and second pieces becoming linearly rigid when superposed on each other, and the first and second pieces returning to a bent state when separated from each other; a head section which joins a leading first piece of the plurality of first pieces and a leading second piece of the plurality of second pieces; and a sending-out mechanism section including a plurality of rollers for firmly superposing the first and second pieces and supporting the first and second pieces movably to front and rear; wherein at least one groove section that extends from front to rear is formed in surfaces of the first and second pieces on sides that come in contact with the rollers.

BRIEF DESCRIPTION OF THE VIEWS OF THE DRAWING

FIG. 9A is a side view illustrating another structure of the second piece shown in FIG. 3.

FIG. 9B is a front view illustrating another structure of the second piece shown in FIG. 3.

FIG. 9C is a rear-side perspective view illustrating another structure of the second piece shown in FIG. 3.

FIG. 9D is a front-side perspective view illustrating another structure of the second piece shown in FIG. 3.

DETAILED DESCRIPTION

Figure 1:
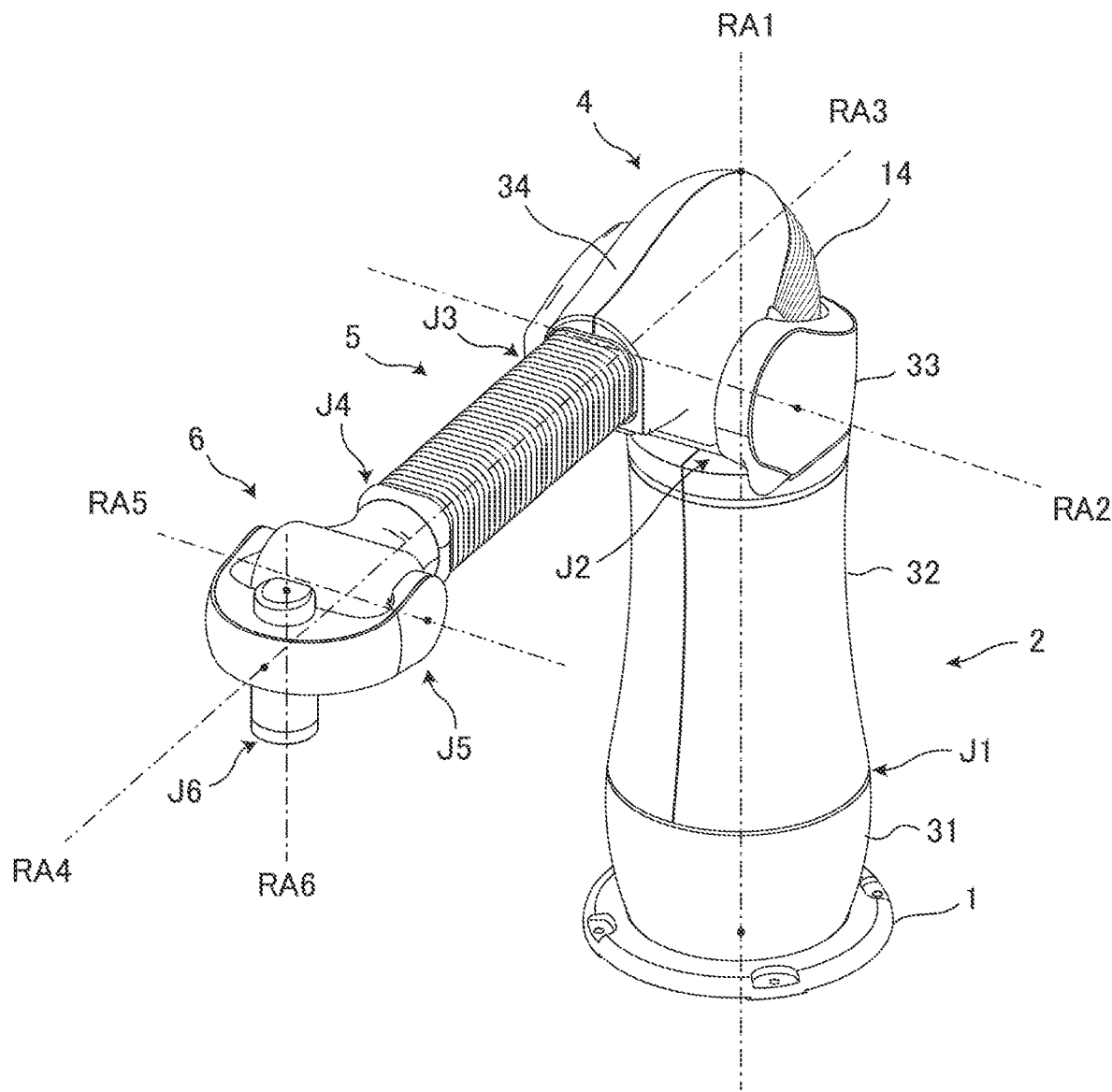
FIG. 1 illustrates the external appearance of a robot arm mechanism that includes a linear extension and retraction joint according to a first embodiment.

A linear extension and retraction mechanism according to a first, second and third embodiment will be described below while referring to the attached drawings. Note that, the linear extension and retraction mechanism according to the respective embodiments can be used as an independent mechanism (joint). In the following description, robot arm mechanisms in which one joint among a plurality of joints is constituted by a linear extension and retraction mechanism according to the respective embodiments are described as examples. Although a polar-coordinate type robot arm mechanism equipped with a linear extension and retraction mechanism is described herein as an example of a robot arm mechanism, the robot arm mechanism may be of another type. In the description below, the same reference numerals are given to constituent elements having substantially the same functions and constitutions, and duplicated explanation will be made only when necessary.

Figure 2:
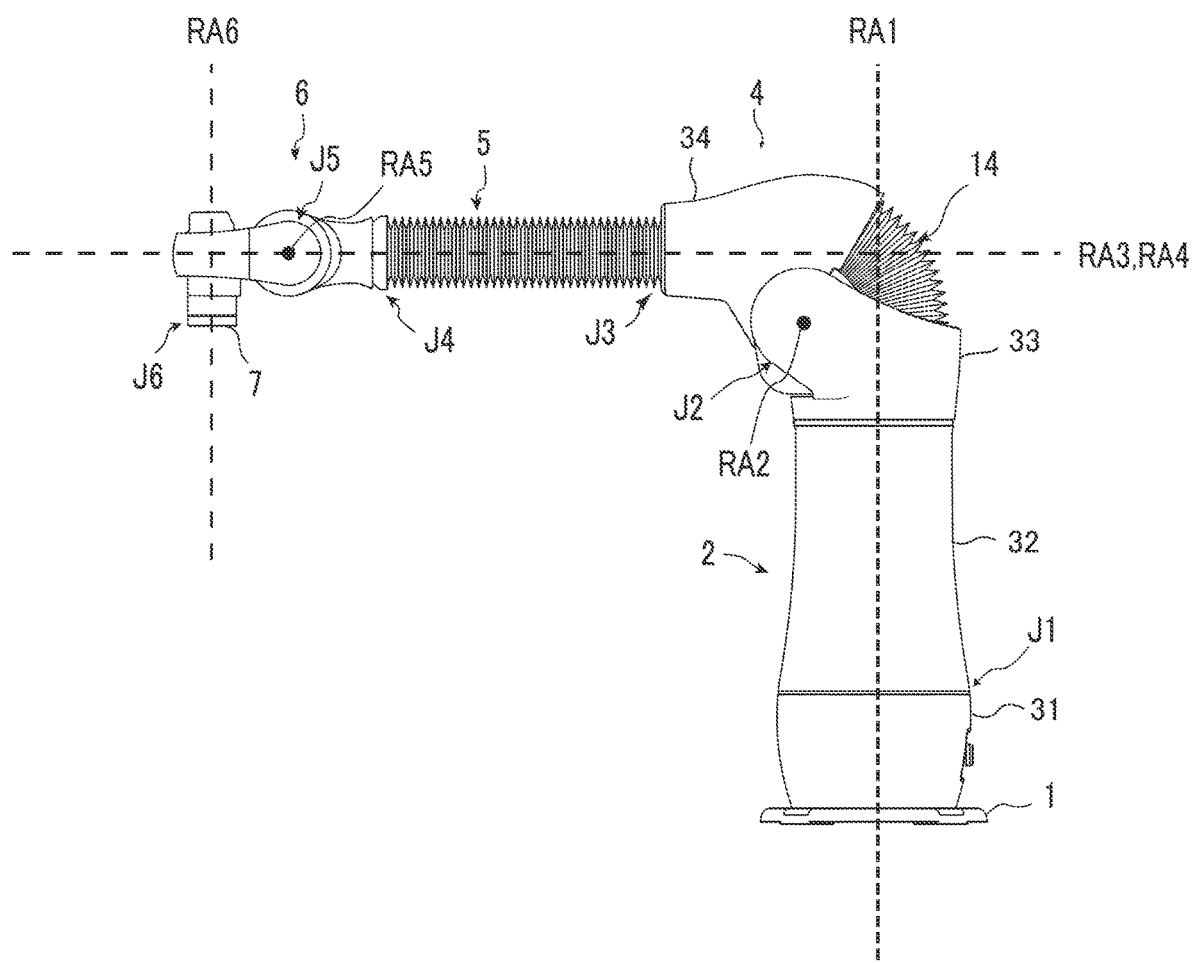
FIG. 2 is a side view illustrating the robot arm mechanism shown in FIG. 1.
Figure 3:
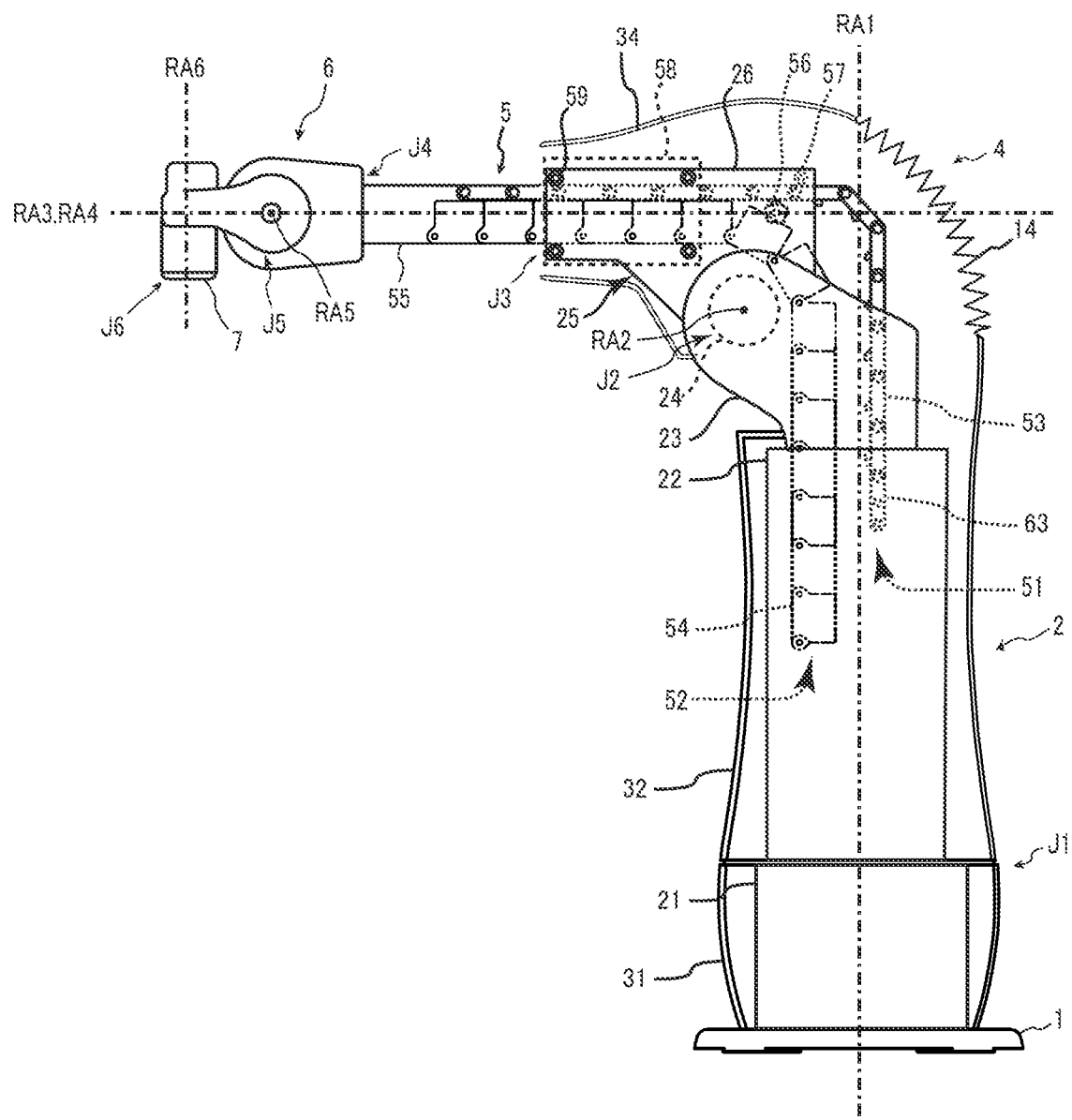
FIG. 3 is a side view illustrating the inner structure of the robot arm mechanism shown in FIG. 1.

FIG. 1 illustrates the external appearance of a robot arm mechanism that includes a linear extension and retraction joint according to a first embodiment. FIG. 2 is a side view of the robot arm mechanism illustrated in FIG. 1. FIG. 3 is a view of the inner structure of the robot arm mechanism shown in FIG. 1 as seen from the side.

The robot arm mechanism includes a base 1, a columnar support section 2, a shoulder section 4, an arm section 5 and a wrist section 6. The columnar support section 2, shoulder section 4, arm section 5 and wrist section 6 are arranged in that order from the base 1. A plurality of joints J1, J2, J3, J4, J5 and J6 are arranged in that order from the base 1. The columnar support section 2 that forms a cylindrical body is typically installed vertically on the base 1. The columnar support section 2 functions as a first joint J1 as a rotary joint for turning. The first joint J1 includes an axis of rotation RA1. The axis of rotation RA1 is parallel to the vertical direction. The columnar support section 2 has a lower frame 21 and an upper frame 22. One end of the lower frame 21 is connected to a fixed section of the first joint J1. The other end of the lower frame 21 is connected to the base 1. The lower frame 21 is covered by a cylindrical housing 31. The upper frame 22 is connected to a rotating section of the first joint J1, and axially rotates on the axis of rotation RA1. The upper frame 22 is covered by a cylindrical housing 32. The upper frame 22 rotates with respect to the lower frame 21 accompanying rotation of the first joint J1, and by this means the arm section 5 turns horizontally. First and second piece strings 51 and 52 of the third joint J3 as a linear extension and retraction mechanism that is described later are housed in an inner hollow of the columnar support section 2 that forms a cylindrical body.

A shoulder section 4 that houses the second joint J2 as an up/down rotary joint is arranged at an upper part of the columnar support section 2. The second joint J2 is a rotary joint. The second joint J2 has an axis of rotation RA2 that is perpendicular to the axis of rotation RA1. The shoulder section 4 has a pair of side frames 23 as a fixed section (support body) of the second joint J2. The pair of side frames 23 are connected to the upper frame 22. The pair of side frames 23 are covered by a cover 33 that has a saddle shape. A cylindrical body 24 as a rotating section of the second joint J2 that also serves as a motor housing is supported by the pair of side frames 23. A sending-out mechanism 25 is mounted on the peripheral surface of the cylindrical body 24. A drive gear 56, a guide roller 57 and a roller unit 58 are supported by a frame 26 of the sending-out mechanism 25. The sending-out mechanism 25 rotates accompanying axial rotation of the cylindrical body 24, and the arm section 5 that is supported by the sending-out mechanism 25 rotates upward and downward. The sending-out mechanism 25 is covered by a cylindrical cover 34. A gap between the saddle-shaped cover 33 and the cylindrical cover 34 is covered by a U-shaped bellows cover 14 that has a cross-sectional U shape. The U-shaped bellows cover 14 expands and contracts in a manner that follows upward and downward rotation of the second joint J2.

The third joint J3 is provided by a linear extension and retraction mechanism. The linear extension and retraction mechanism is equipped with a structure that was newly developed by the present inventors, and is clearly distinguished from a so-called "conventional linear motion joint" from the viewpoint of the movable range thereof. Although the arm section 5 of the third joint J3 is bendable, the bending is restricted when the arm section 5 is sent out in the forward direction from the sending-out mechanism 25 that is a root of the arm section 5 along a center axis (extension and contraction center axis RA3), and linear rigidity is secured. Bending of the arm section 5 is restored when the arm section 5 is pulled back in the rearward direction. The arm section 5 has the first piece string 51 and the second piece string 52. The first piece string 51 includes a plurality of first pieces 53 that are bendably connected. The first pieces 53 are formed in a substantially flat plate shape. The first pieces 53 are bendably connected at hinge sections at end parts thereof. The second piece string 52 includes a plurality of second pieces 54. Each second piece 54 is formed in the shape of a groove-like body having an inverted C-shape in transverse section or as a hollow square-shaped cylindrical body. The second pieces 54 are bendably connected at a hinge section at an end part of a bottom plate thereof. Bending of the second piece string 52 is restricted at positions at which end faces of side plates of the second pieces 54 butt against each other. At such positions, the second piece string 52 is linearly arranged. A leading first piece 53 of the first piece string 51 and a leading second piece 54 of the second piece string 52 are connected by a head piece 55. For example, the head piece 55 has a combined shape of the first piece 53 and the second piece 54.

The first and second piece strings 51 and 52 are pressed together and caused to be firmly superposed with respect to each other when passing between the roller unit 58. By being firmly superposed, the first and second piece strings 51 and 52 manifest linear rigidity, and thereby constitute the columnar arm section 5. The drive gear 56 is arranged together with the guide roller 57 at the rear of the roller unit 58. The drive gear 56 is connected to an unshown motor unit. The motor unit generates motive power for rotating the drive gear 56. A linear gear 539 is formed along the connecting direction at the width center of a face on the inner side of the first piece 53, that is, a face on the side that contacts the second piece 54. The linear gears 539 which are adjacent when a plurality of the first pieces 53 are linearly aligned are connected linearly to constitute a long linear gear. The drive gear 56 is meshed with the linear gear 539 of the first piece 53 that is pressed by the guide roller 57. The linear gears 539 that are connected linearly constitute a rack-and-pinion mechanism together with the drive gear 56. When the drive gear 56 rotates forward, the first and second piece strings 51 and 52 are sent out in the forward direction from the roller unit 58. When the drive gear 56 rotates backward, the first and second piece strings 51 and 52 are pulled back to the rear of the roller unit 58. The first and second piece strings 51 and 52 that were pulled back are separated from each other between the roller unit 58 and the drive gear 56. The separated first and second piece strings 51 and 52 each return to a bendable state. The first and second piece strings 51 and 52 that returned to a bendable state both bend in the same direction (inward) and are vertically housed inside the columnar support section 2. At this time, the first piece string 51 is housed in a substantially aligned state approximately parallel to the second piece string 52.

The wrist section 6 is attached to the tip of the arm section 5. The wrist section 6 includes fourth to sixth joints J4 to J6. The fourth to sixth joints J4 to J6 have three axes of rotation RA4 to RA6, respectively, that are orthogonal. The fourth joint J4 is a rotary joint that rotates on the fourth axis of rotation RA4 that approximately matches the extension and contraction center axis RA3. An end effector is oscillatingly rotated by rotation of the fourth joint J4. The fifth joint J5 is a rotary joint that rotates on the fifth axis of rotation RA5 that is perpendicular to the fourth axis of rotation RA4. The end effector is tilted and rotated to front and rear by rotation of the fifth joint J5. The sixth joint J6 is a rotary joint that rotates on the sixth axis of rotation RA6 that is perpendicular to the fourth axis of rotation RA4 and the fifth axis of rotation RA5. The end effector is axially rotated by rotation of the sixth joint J6.

The end effector is mounted to an adaptor 7 that is provided at a lower part of the rotating section of the sixth joint J6 of the wrist section 6. The end effector is a portion that has a function that allows the robot to directly act on a work object (work), and, for example, various tools exist in accordance with a required task, such as a gripping portion, a vacuum suction portion, a nut fastening tool, a welding gun, and a spray gun. The end effector is moved to a given position by the first, second and third joints J1, J2 and J3, and is disposed in a given posture by the fourth, fifth and sixth joints J4, J5 and J6. In particular, the length of the extension and retraction distance of the arm section 5 of the third joint J3 allows the end effector to reach objects in a wide range from a position close to the base 1 to a position far from the base 1. Characteristic features of the third joint J3 with respect to which the third joint J3 differs from previous linear motion joints are the linear extension and retraction motions realized by the linear extension and retraction mechanism constituting the third joint J3, and the length of the extension and retraction distance thereof.

Figure 4:
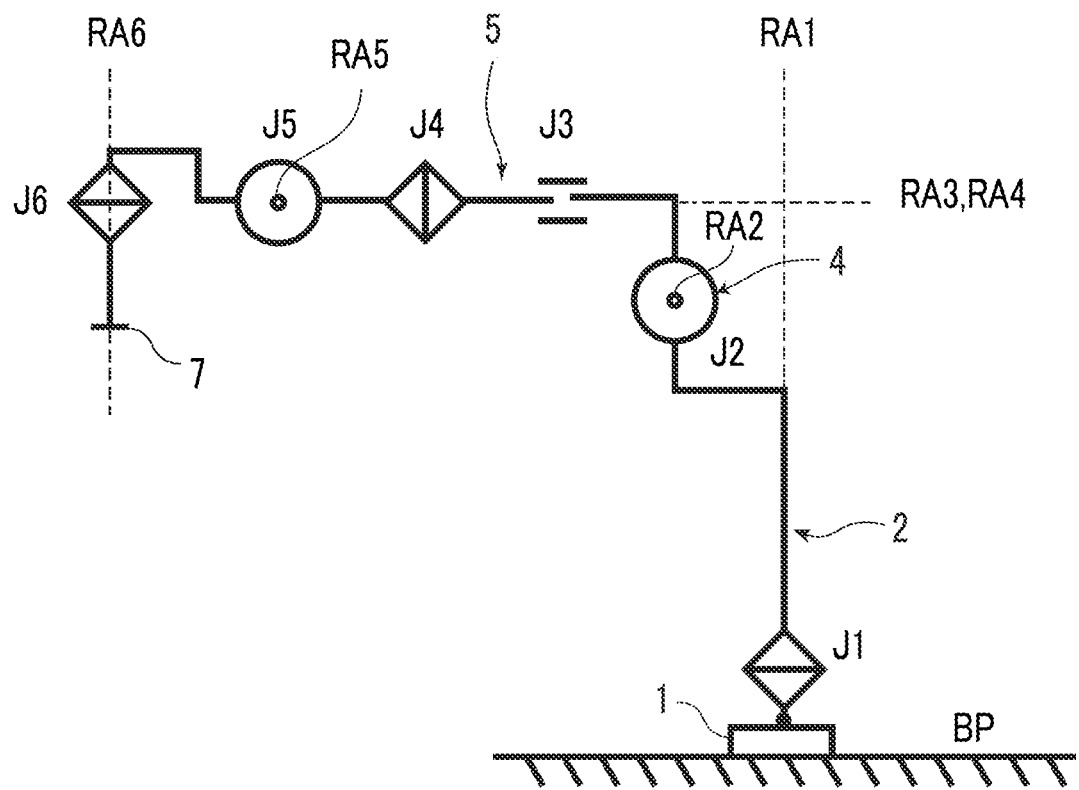
FIG. 4 is a view illustrating the configuration of the robot arm mechanism shown in FIG. 1 by representation with graphic symbols.

FIG. 4 is a view illustrating the configuration of the robot arm mechanism by representation with graphic symbols. In the robot arm mechanism, three positional degrees of freedom are realized by the first joint J1, the second joint J2 and the third joint J3 constituting the root three axes. Further, three postural degrees of freedom are realized by the fourth joint J4, the fifth joint J5 and the sixth joint J6 constituting the wrist three axes. As illustrated in FIG. 4, the axis of rotation RA1 of the first joint J1 is provided in the vertical direction. The axis of rotation RA2 of the second joint J2 is provided in the horizontal direction. Relative to the first joint J1, the second joint J2 is offset in relation to two directions, namely, the direction of the axis of rotation RA1 and the direction of an axis that is orthogonal to the axis of rotation RA1. The axis of rotation RA2 of the second joint J2 does not intersect with the axis of rotation RA1 of the first joint J1. The axis of movement RA3 of the third joint J3 is provided in a perpendicular direction relative to the axis of rotation RA2. Relative to the second joint J2, the third joint J3 is offset in relation to two directions, namely, the axis of rotation RA1 and the direction of an axis that is orthogonal to the axis of rotation RA1. The axis of rotation RA3 of the third joint J3 does not intersect with the axis of rotation RA2 of the second joint J2. By replacing one rotary joint among the root three axes of the plurality of joints J1 to J6 with a linear extension and retraction joint J3, causing the second joint J2 to be offset in two directions with respect to the first joint J1, and causing the third joint J3 to be offset in two directions with respect to the second joint J2, the robot arm mechanism of the robot device according to the present embodiment structurally eliminates a singular point posture.

At least one groove section that extends from front to rear is formed in surfaces of the first and second pieces 53 and 54 that are included in the linear extension and retraction mechanism according to the present embodiment.

(First Piece 53)

Figure 5A:
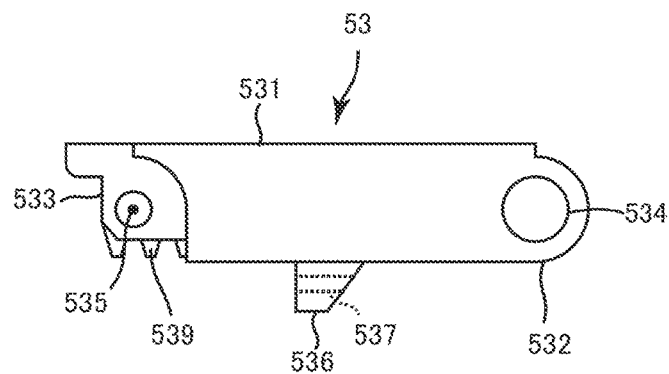
FIG. 5A is a side view illustrating the structure of a first piece shown in FIG. 3.
Figure 5B:
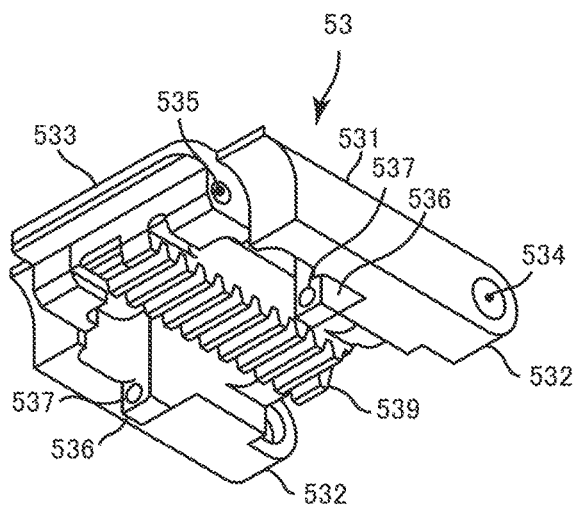
FIG. 5B is a lower-side perspective view illustrating the structure of the first piece shown in FIG. 3.
Figure 5C:
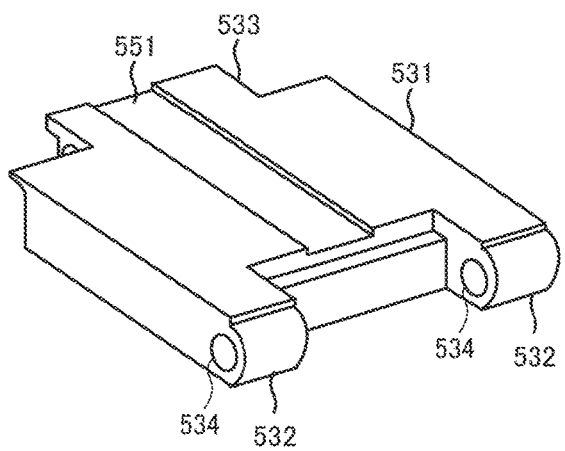
FIG. 5C is an upper-side perspective view illustrating the structure of the first piece shown in FIG. 3.
Figure 6A:
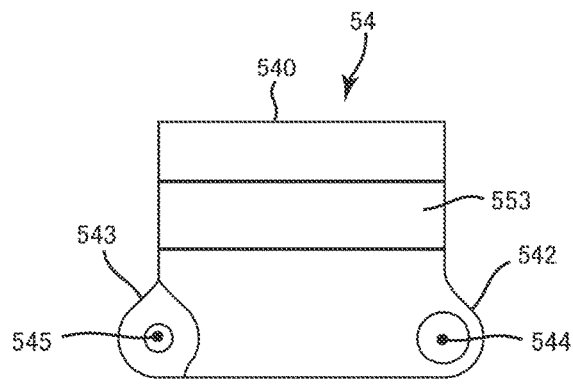
FIG. 6A is a side view illustrating the structure of the second piece shown in FIG. 3.
Figure 6B:
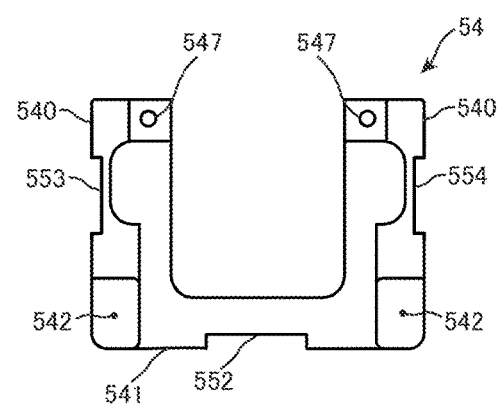
FIG. 6B is a front view illustrating the structure of the second piece shown in FIG. 3.
Figure 6C:
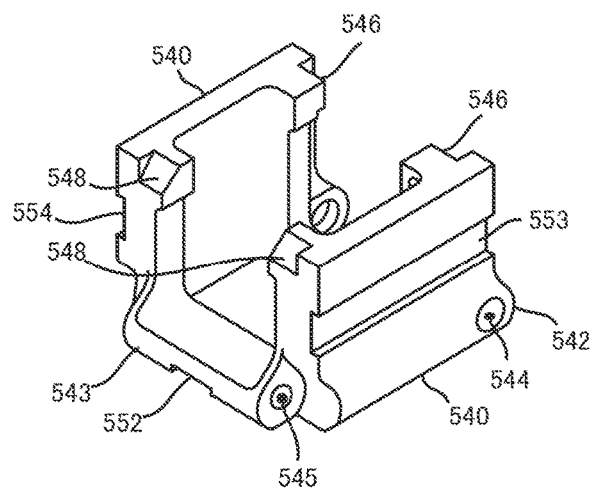
FIG. 6C is a rear-side perspective view illustrating the structure of the second piece shown in FIG. 3.
Figure 6D:
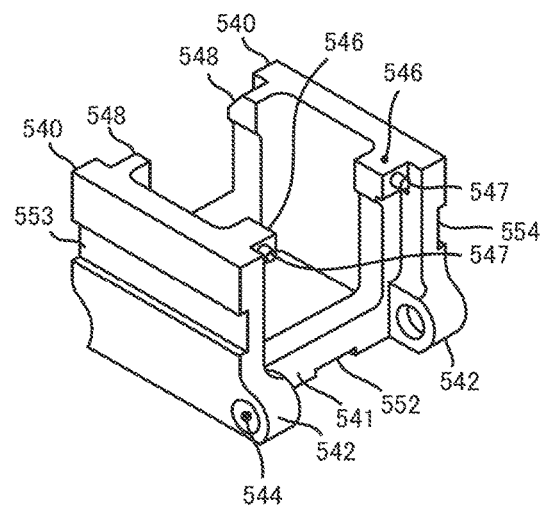
FIG. 6D is a front-side perspective view illustrating the structure of the second piece shown in FIG. 3.

FIG. 5A, FIG. 5B and FIG. 5C are views illustrating the structure of the first piece 53 shown in FIG. 3. The first piece 53 has a substantially flat plate shape overall. A bearing section 533 projects rearward at the center of the rear end of a main body part 531 that is a rectangular flat plate. Shaft support bodies 532 project forward on both sides at the front end of the main body part 531. The bearing section 533 of the first piece 53 is fitted between the shaft support bodies 532 of the adjacent first piece 53 on the rear side of the relevant first piece 53. An unshown shaft is inserted into a bearing hole 535 of the bearing section 533. The two ends of the shaft are fixed to shaft brackets 534 of the shaft support bodies 532. A plurality of the first pieces 53 are bendably connected by means of this hinge structure. The linear gear 539 is provided so as to extend from front to rear in parallel with the connecting direction (length direction) at the width center on a back face of the first piece 53. A pair of projection sections (pinhole block) 536 having a truncated square pyramid shape are protruded vertically on both side on the aforementioned back face. The pair of pinhole blocks 536 are located on both sides in the vicinity of the center in the front-rear direction of the first piece 53. A lock pinhole 537 is formed along the front-rear direction in the pinhole block 536.

(Second Piece 54)

FIG. 6A, FIG. 6B, FIG. 6C, and FIG. 6D are views illustrating the structure of the second piece 54 shown in FIG. 3. The second piece 54 is a groove-like body having an inverted C-shape in cross section or is a cylindrical body having a hollow square shape in cross section. Here, it is assumed that the second piece 54 is a groove-like body having an inverted C-shape in cross section. The second piece 54 includes a bottom plate 541, and a pair of side plates 540 having the same size and the same shape. A bearing section 543 projects rearward at the center of the rear end of the bottom plate 541. Shaft support bodies 542 project forward on both sides at the front end of the bottom plate 541. The bearing section 543 is fitted between the shaft support bodies 542 of the adjacent second piece 54 on the rear side of the relevant second piece 54. An unshown shaft is inserted into a bearing hole 545 of the bearing section 543. The two ends of the shaft are fixed to shaft brackets 544 of the shaft support bodies 542. A plurality of the second pieces 54 are bendably connected by means of this hinge structure.

A lock pin block 546 is provided so as to extend inward at an upper part of the front end of each of the pair of side plates 540. The lock pin block 546 has a cuboid shape, and a lock pin 547 that protrudes forward is provided on a front face thereof. The lock pin 547 is formed in the shape of a circular cylindrical body, and is provided so as to protrude forward in parallel with the connecting direction. A chuck block 548 is provided so as to extend inward at an upper part of the rear end of each of the pair of side plates 540. The chuck block 548 has a truncated square pyramid shape, and an inclined face thereof faces rearward. In the second piece string 52, among each pair of successive second pieces 54, the chuck blocks 548 of the front second piece 54 and the lock pin blocks 546 of the rear second piece 54 constitute a receiving section that receives the pinhole block 536 at the front and rear.

(Lock Mechanism)

The linear extension and retraction mechanism has a lock mechanism for firmly maintaining a state in which the first and second pieces 53 and 54 are superposed. The lock mechanism is composed of the chuck blocks 548 and lock pin blocks 546 of the second piece 54, and the pinhole blocks 536 of the first piece 53.

When the arm section 5 is extended, the pinhole block 536 of the first piece 53 is sandwiched by the receiving section formed by the corresponding pair of successive second pieces 54, and by this means the state in which the first and second pieces 53 and 54 are superposed is firmly maintained. In the state in which the first and second pieces 53 and 54 are superposed, a state in which the lock pins 547 of each second piece 54 are inserted in the pinholes 537 of the corresponding first piece 53 is maintained. The lock pins 547 of the second piece 54 are inserted into the pinholes 537 of the first piece 53 when the second piece 54 passes a rearmost roller 59 of the roller unit 58 and is aligned linearly with respect to the second piece 54 that is immediately forward thereof. In a state in which the lock pins 547 of the second pieces 54 are inserted in the pinholes 537 of the first pieces 53, a state in which the corresponding pairs of successive second pieces 54 are linearly aligned, that is, a state in which a rear end portion of the arm section 5 is firmly held in the roller unit 58 is maintained.

When the arm section 5 is retracted, at the rear of the roller unit 58, the second pieces 54 return to a bendable state and are drawn downward by the force of gravity. On the other hand, the first pieces 53 are drawn rearward by the drive gear 56 in a state in which the horizontal posture thereof is maintained. By the second pieces 54 being drawn downward and the first pieces 53 being drawn rearward, the lock pins 547 of the second pieces 54 come out from the pinholes 537 of the first pieces 53, and the receiving sections formed by pairs of successive second pieces 54 release the pinhole blocks 536 of the first pieces 53, and as a result the state in which the first and second pieces 53 and 54 are superposed is released and the first and second pieces 53 and 54 are bendably separated from each other.

At least one groove section that extends from front to rear is formed in at least one surface among four surfaces that contact the rollers of the first and second pieces 53 and 54 constituting the arm section 5 of the linear extension and retraction mechanism according to the present embodiment. In this example, a groove section 551 is formed in the top surface of the first piece 53. A groove section 552 is formed in the bottom surface of the second piece 54. Groove sections 553 and 554 are formed in the two side surfaces of the second piece 54. This configuration is described in detail hereunder.

The groove section 551 is located at the width center on a surface which, among the surfaces of the first piece 53, contacts an upper roller 59, that is, on the top surface of the first piece 53, and extends from front to rear in parallel with the length direction (front-rear direction) of the first piece 53. The groove section 551, for example, is a shallow rectangular groove of 1 mm or less than 1 mm, and ideally the width thereof is within a range of ⅕ to ⅘ of the width of the first piece 53, and preferably is ½ of the width of the first piece 53.

The groove section 552 is located at the width center on a surface which, among the surfaces of the second piece 54, contacts a lower roller 59, that is, on the bottom surface of the bottom plate 541 of the second piece 54, and extends from front to rear in parallel with the length direction (front-rear direction) of the second piece 54. The groove section 552, for example, is a shallow rectangular groove of 1 mm or less than 1 mm, and the width thereof is approximately equal to the width of the groove section 551 of the first piece 53.

The groove sections 553 and 554 are provided at the width center on surfaces which, among the surfaces of the second piece 54, contact left and right rollers 60, that is, on the two side plates 540, and extend from front to rear in parallel with the length direction of the second piece 54. The groove sections 553 and 554, for example, are shallow rectangular grooves of 1 mm or less than 1 mm, and the width of the respective groove sections 553 and 554 is ideally within a range of ⅕ to ⅘ of the height of a side plate 540-1 (height of the second piece 54), and preferably is approximately equal to the width of the groove section 551 of the first piece 53.

When the first and second pieces 53 and 54 are superposed and linearly aligned, the groove sections 552, 553 and 554 of the first and second pieces 53 and 54 connect in a straight line, respectively. On each of the bottom surface, the left side surface and the right side surface of the arm section 5, a long groove section is formed that extends along the axial direction of the corresponding surface.

Although described in detail later, among the top surface of the first piece 53 and the bottom surface and side surfaces of the second piece 54, a surface which contacts an outer peripheral surface (rolling contact surface) of a roller needs to be subjected to machining such as cutting, grinding and polishing with high dimensional accuracy and high surface accuracy (surface roughness) to ensure smooth forward and rearward linear movement of the arm section 5. Because the groove sections 552, 553 and 554 are recessed and do not contact the outer peripheral surface of a roller, high dimensional accuracy and high surface accuracy is not required for the groove sections 552, 553 and 554. By decreasing the area in which high dimensional accuracy and high surface accuracy are required, a decrease in the processing cost and yield is realized, and thus the cost of manufacturing the first and second pieces 53 and 54 can be reduced.

Figure 7A:
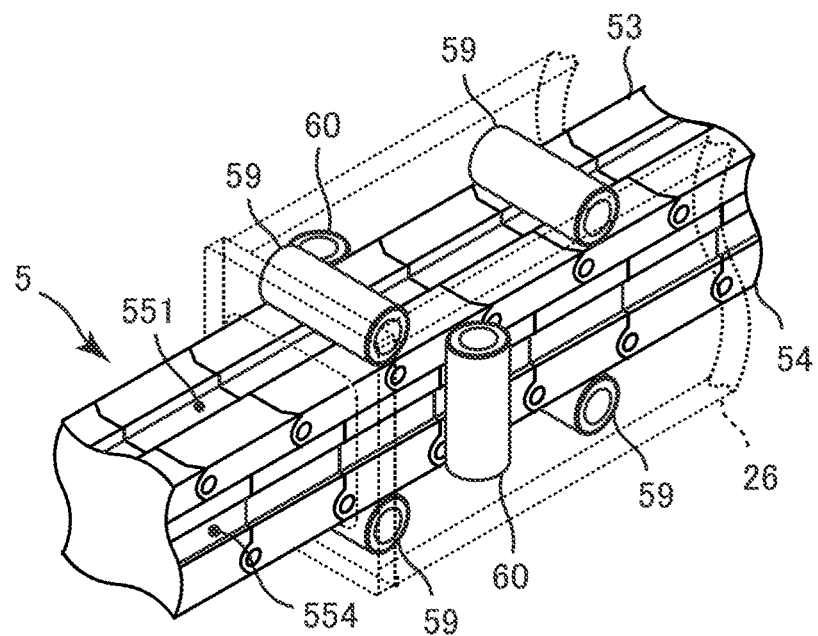
FIG. 7A is a perspective view illustrating an arm section shown in FIG. 3 together with rollers.
Figure 7B:
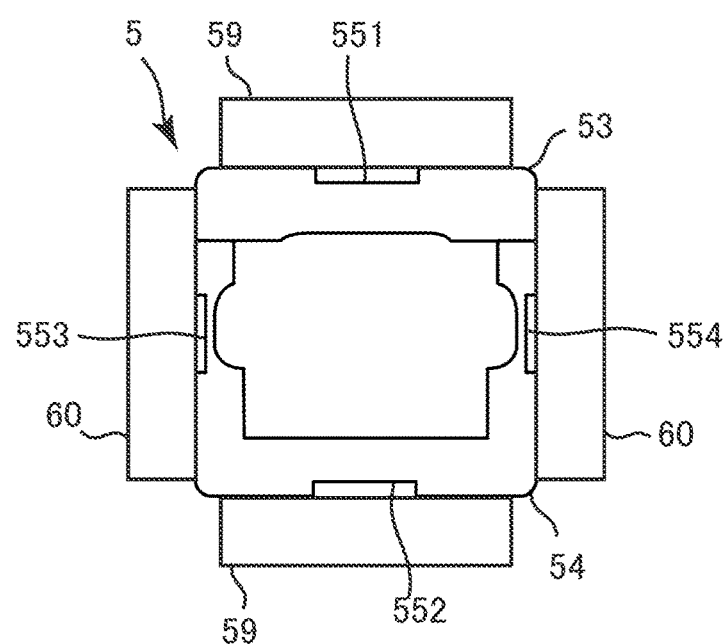
FIG. 7B is a front view illustrating the arm section shown in FIG. 3 together with rollers.

FIG. 7A and FIG. 7B are views illustrating the arm section 5 shown in FIG. 3 together with rollers of the sending-out mechanism. Along with the drive gear 56, the guide roller 57 and the first and second piece strings 51 and 52, the roller unit 58 is a main structure of the linear extension and retraction mechanism (the third joint J3). The roller unit 58 includes the upper and lower rollers 59 and the left and right rollers 60.

The upper and lower rollers 59 have an axis of rotation that is parallel to the axis of rotation RA2. For example, four the upper and lower rollers 59 are provided, with two of the rollers 59 arranged on the upper side of the axis of movement RA3, and the remaining two rollers 59 arranged on the lower side. The two rollers 59 that are on the upper side and lower side, respectively, are arranged in a line along the axis of movement RA3 so that their axes of rotation are parallel with each other. The two rollers 59 on the upper side are separated from the two rollers 59 on the lower side by a distance that is equivalent to the total thickness of the first and second pieces 53 and 54 that are superposed. In this case, the total thickness of the first and second pieces 53 and 54 is approximately equal to a distance from the lowermost surface of the arm section 5 to the uppermost surface of the arm section 5. By this means, the upper and lower rollers 59 can cause the first and second pieces 53 and 54 to be superposed, and can firmly press the first and second pieces 53 and 54 from above and below and support the first and second pieces 53 and 54 movably to front and rear.

The left and right rollers 60 have an axis of rotation that is orthogonal to the axis of movement RA3 and the axis of rotation RA2. For example, two of the left and right rollers 60 are provided, with one of the rollers 60 arranged on the left side of the axis of movement RA3 and the remaining one roller 60 arranged on the right side. The roller 60 on the left side and the roller 60 on the right side are separated from each other by a distance that is equivalent to the width of the first and second pieces 53 and 54. In this case, the width of the first and second pieces 53 and 54 is approximately equal to a distance from the outermost surface on the left side of the arm section 5 to the outermost surface on the right side thereof. By this means, the left and right rollers 60 cause the first and second pieces 53 and 54 to be firmly superposed from the left and right sides and also support the first and second pieces 53 and 54 movably to front and rear.

Smooth forward and rearward linear movement of the arm section 5 is required in order to cause an end effector that is mounted at the tip of the arm section 5 to move with high positional accuracy. One condition for realizing smooth forward and rearward linear movement of the arm section 5 is that the arm section 5 is firmly sandwiched from top, bottom, left and right by rollers. To enhance the durability of the first and second pieces 53 and 54 in order to firmly sandwich the arm section 5 from top, bottom, left and right by means of the rollers 59 and 60 and also smoothly move the arm section 5 forward and rearward, it is necessary to achieve high dimensional accuracy with respect to the first and second pieces 53 and 54 that contact the rollers 59 and 60 and also achieve high surface accuracy (surface roughness) with respect thereto. However, machining for high dimensional accuracy and high surface accuracy is expensive and also lowers the yield.

According to the present embodiment, the groove sections 551, 552, 553 and 554 are formed as recesses extending from front to rear in the top, bottom, left and right surfaces, respectively, of the arm section 5 which contact the rollers. Specifically, the groove section 551 is provided in a surface that contacts rollers of the first piece 53, the groove section 552 is provided in a surface that contacts rollers of the bottom plate 541 of the second piece 54, the groove section 553 is provided in a surface that contacts a roller of the side plate 540-1 of the second piece 54, and the groove section 554 is provided in a surface that contacts a roller of the side plate 540 of the second piece 54.

The groove sections 551, 552, 553 and 554 provided in the surfaces on the sides of the arm section 5 that contact the top, bottom, left and right rollers 59 and 60 do not contact the rollers 59 and 60. Therefore, providing the groove sections 551, 552, 553 and 554 on surfaces on sides contacting rollers on the top, bottom, left and right of the arm section 5 reduces the area of the piece surfaces that contact the rollers 59 and 60, that is, reduces the area for which highly accurate machining is required, and thereby contributes to lowering the manufacturing cost of the first and second pieces 53 and 54. Further, by the groove sections 551, 552, 553 and 554 that are provided on the surfaces of the first and second pieces 53 and 54 being provided so as to extend from front to rear of the pieces and not from side to side of the pieces, a state in which one portion of the rollers 59 and 60 always contacts against surfaces on the top, bottom, left and right of the arm section 5 is secured. Thus, by the groove sections 551, 552, 553 and 554 being provided in the surfaces of the first and second pieces 53 and 54, a decrease in the supporting force of the rollers 59 and 60 which support the arm section 5 from the top, bottom, left and right can be suppressed, and smooth forward and rearward movement of the arm section 5 of the linear extension and retraction mechanism is not hindered.

In addition, making the width of the groove section 552 on the bottom surface of the arm section 5 the same as the width of the groove section 551 on the top surface makes the stress which the bottom surface of the arm section 5 receives from the lower roller 59 equal to the stress which the top surface of the arm section 5 receives from the upper roller 59, and suppresses the occurrence of overloading of one roller among the upper roller 59 and the lower roller 59. Accordingly, by the groove sections 551 and 552 being provided in the first and second pieces 53 and 54, a decrease in the durability performance between the first and second pieces 53 and 54 and the upper and lower rollers 59 is inhibited, and an increase in the replacement frequency of these components is suppressed. Similarly, making the width of the groove section 553 on the left side surface of the arm section 5 the same as the width of the groove section 554 on the right side surface means that a decrease in the durability performance between the second piece 54 and the left and right rollers 60 is suppressed by providing the groove sections 553 and 554 on the respective surfaces of the pair of side plates 540, and thus suppresses an increase in the replacement frequency of these components.

Note that, although in the foregoing description an example is described in which groove sections are recessed into the surfaces (surfaces that contact rollers) of the first and second pieces 53 and 54, embodiments of the present invention are not limited thereto. For example, an effect can be achieved to a certain extent if a groove section is provided in at least one surface among the top, bottom, left and right surfaces of the arm section 5. Further, a plurality of groove sections may be provided that extend from front to rear in respective surfaces of the first and second pieces 53 and 54. Furthermore, a configuration may also be adopted in which the two side surfaces of the arm section 5 are formed together with the pair of side plates 540, and a groove section that extends from front to rear is formed in each of the two side surfaces of the first piece 53.

Figure 8A:
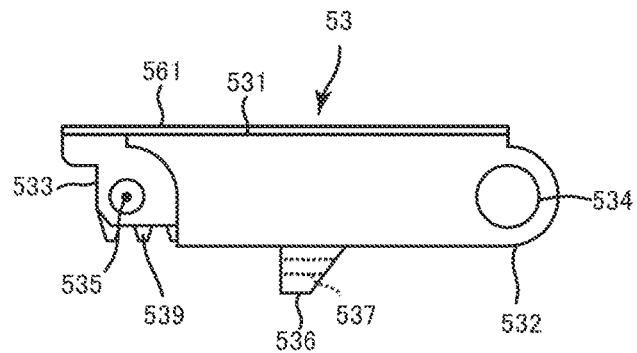
FIG. 8A is a side view illustrating another structure of the first piece shown in FIG. 3.
Figure 8B:
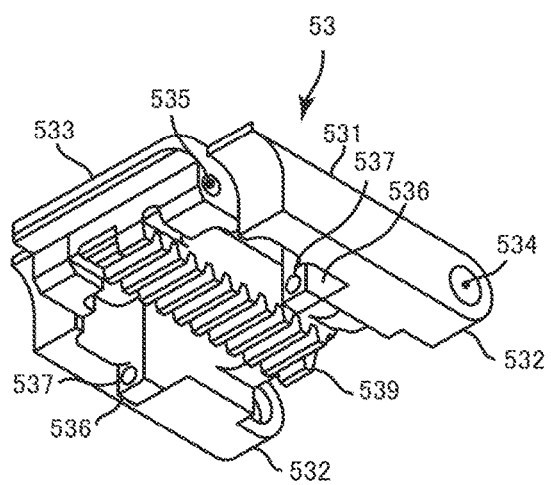
FIG. 8B is a lower-side perspective view illustrating another structure of the first piece shown in FIG. 3.
Figure 8C:
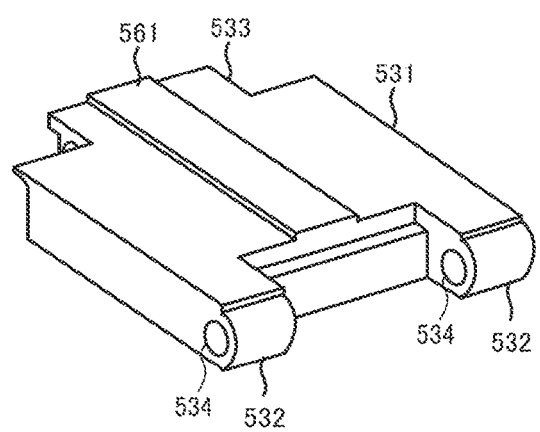
FIG. 8C is an upper-side perspective view illustrating another structure of the first piece shown in FIG. 3.
Figure 10A:
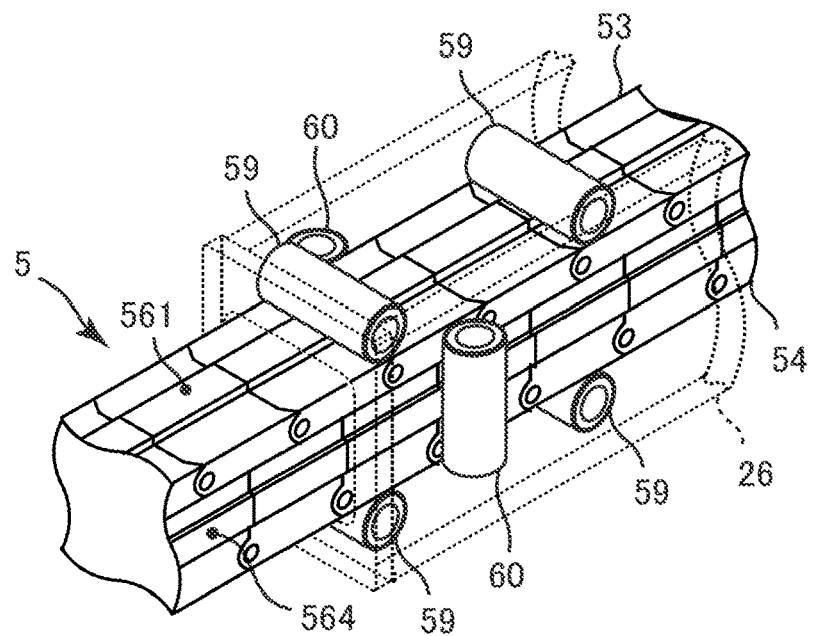
FIG. 10A is a perspective view illustrating an arm section composed of the first pieces shown in FIG. 8A, FIG. 8B and FIG. 8C and the second pieces shown in FIG. 9A, FIG. 9B, FIG. 9C and FIG. 9D, together with rollers.
Figure 10B:
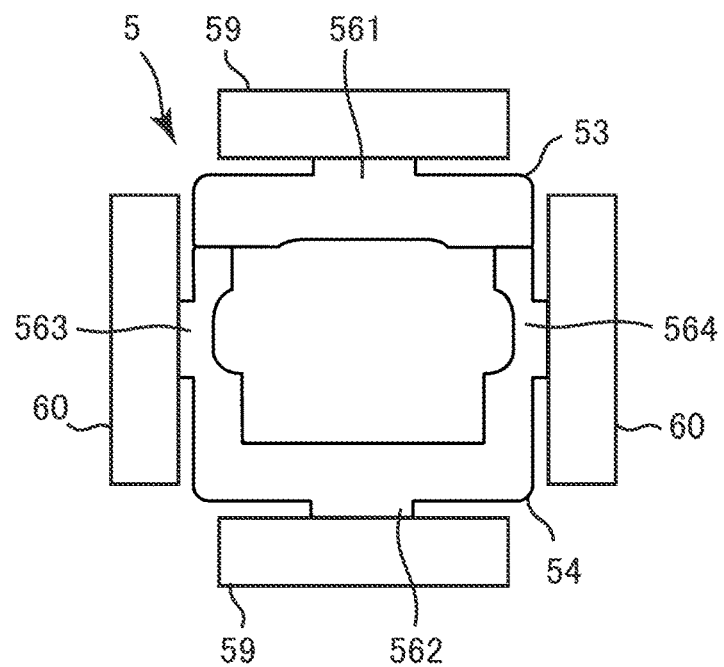
FIG. 10B is a front perspective view illustrating an arm section composed of the first pieces shown in FIG. 8A, FIG. 8B and FIG. 8C and the second pieces shown in FIG. 9A, FIG. 9B, FIG. 9C and FIG. 9D, together with rollers.

In addition, at least one convex linear section that extends from front to rear may be provided in a protruding condition on surfaces (surfaces that contact a roller) of the first and second pieces 53 and 54. FIG. 8A and FIG. 8B are views illustrating another structure of the first piece 53 shown in FIG. 3. FIG. 9A, FIG. 9B, FIG. 9C and FIG. 9D are views illustrating another structure of the second piece 54 shown in FIG. 3. FIG. 10A and FIG. 10B are views illustrating the arm section 5 that is composed of the first piece 53 illustrated in FIG. 8A and FIG. 8B and the second piece 54 illustrated in FIG. 9A, FIG. 9B, FIG. 9C and FIG. 9D, together with rollers. In this case, linear sections 561, 562, 563 and 564 are formed on the four surfaces on the top, bottom, left and right of the arm section 5, respectively.

The linear section 561 is located on a surface that comes in contacts a roller of the first piece 53, that is, at the width center of the top surface of the arm section 5, and is provided extending from front to rear in parallel with the length direction of the first piece 53. The linear section 561 is a low linear protrusion that has a height of several mm, and the width thereof is ideally within a range of ⅕ to ⅘ of the width of the first piece 53, and preferably is ½ of the width of the first piece 53. When a columnar body (arm section 5) is constituted by the first and second pieces 53 and 54 being firmly superposed, the linear sections 561 of adjacent first pieces 53 connect to thereby form a continuous long linear section that extends from front to rear on the top surface of the arm section 5.

The linear section 562 is located on the surface of the bottom plate 541, that is, at the width center of the bottom surface of the arm section 5, and is provided extending from front to rear in parallel with the length direction of the second piece 54. The linear section 562 is a low linear protrusion that has a height of several mm, and the width thereof is approximately equal to the width of the linear section 561 of the first piece 53.

The linear section 563 is located on the surface of the side plate 540-1, that is, at the center of the height of the left side surface of the arm section 5, and is provided extending from front to rear in parallel with the length direction of the second piece 54. The linear section 563 is a low linear protrusion that has a height of several mm, and the width thereof is ideally within a range of ⅕ to ⅘ of the height of the side plate 540-1 (height of the second piece 54), and preferably is approximately equal to the width of the linear section 561 of the first piece 53.

The linear section 564 is located on the surface of the side plate 540, that is, at the center of the height of the right side surface of the arm section 5, and is provided extending from front to rear in parallel with the length direction of the second piece 54. The linear section 564 is formed to have the same cross-sectional shape and width as the linear section 563. When a columnar body (arm section 5) is constituted by the first and second pieces 53 and 54 being firmly superposed, the linear sections 562, 563 and 564 of adjacent second pieces 54 connect to thereby form continuous long linear sections that extend from front to rear on the bottom surface, the left side surface and the right side surface of the arm section 5, respectively.

By providing the linear sections 561, 562, 563 and 564 on surfaces that come in contact with rollers on the top, bottom, left and right of the arm section 5, respectively, an effect can be obtained that is equivalent to the effect obtained in the case where the groove sections 551, 552, 553 and 554 are provided on the surfaces that come in contact with rollers on the top, bottom, left and right of the arm section 5, respectively. That is, the area of the piece surfaces that come in contact with the rollers 59 and 60 is reduced, in other words, the area for which highly accurate machining processing is required is reduced, thereby contributing to a reduction in the manufacturing cost of the first and second pieces 53 and 54. Further, by the linear sections 561, 562, 563 and 564 that are provided on the surfaces of the first and second pieces 53 and 54 being provided so as to extend from front to rear of the pieces and not from side to side of the pieces, a state in which one portion of the rollers 59 and 60 always contacts against surfaces on the top, bottom, left and right of the arm section 5 is secured. Thus, by the linear sections 561, 562, 563 and 564 being provided on the surfaces of the first and second pieces 53 and 54, a decrease in the supporting force of the rollers 59 and 60 which support the arm section 5 from the top, bottom, left and right can be suppressed, and smooth forward and rearward movement of the arm section 5 of the linear extension and retraction mechanism is not hindered.

In addition, making the width of the linear section 562 on the bottom surface of the arm section 5 the same as the width of the linear section 561 on the top surface makes the stress which the bottom surface of the arm section 5 receives from the lower roller 59 equal to the stress which the top surface of the arm section 5 receives from the upper roller 59, and suppresses the occurrence of overloading of one roller among the upper roller 59 and the lower roller 59. Accordingly, by the linear sections 561 and 562 being provided in the first and second pieces 53 and 54, a decrease in the durability performance between the first and second pieces 53 and 54 and the upper and lower rollers 59 is suppressed, and thus an increase in the replacement frequency of these components is also suppressed. Similarly, making the width of the linear section 563 on the left side surface of the arm section 5 the same as the width of the linear section 564 on the right side surface means that, by providing the linear section 563 and 564 on the surfaces of the pair of side plates 540, respectively, a decrease in the durability performance between the second piece 54 and the left and right rollers 60 is suppressed, and thus an increase in the replacement frequency of these components is also suppressed.

Note that, although in the foregoing description an example is described in which linear sections are provided in a protruding condition on the surfaces (surfaces that come in contact with rollers) of the first and second pieces 53 and 54, embodiments of the present invention are not limited thereto. For example, a linear section may be provided on at least one surface among the top, bottom, left and right surface of the arm section 5. Further, a plurality of linear sections that extend from front to rear may be provided on respective surfaces of the first and second pieces 53 and 54. Furthermore, a configuration may also be adopted in which the two side surfaces of the arm section 5 are formed together with the pair of side plates 540, and a linear section that extends from front to rear is formed in each of the two side surfaces of the first piece 53. In addition, the linear section may have a shape such that a cross-section thereof is a circular arc shape or a triangular shape or the like in which the width narrows from the piece surface toward the outer side. By this means, the area for which highly accurate machining processing is required is reduced, and thus the manufacturing cost of the first and second pieces 53 and 54 can be reduced.

Figure 11A:
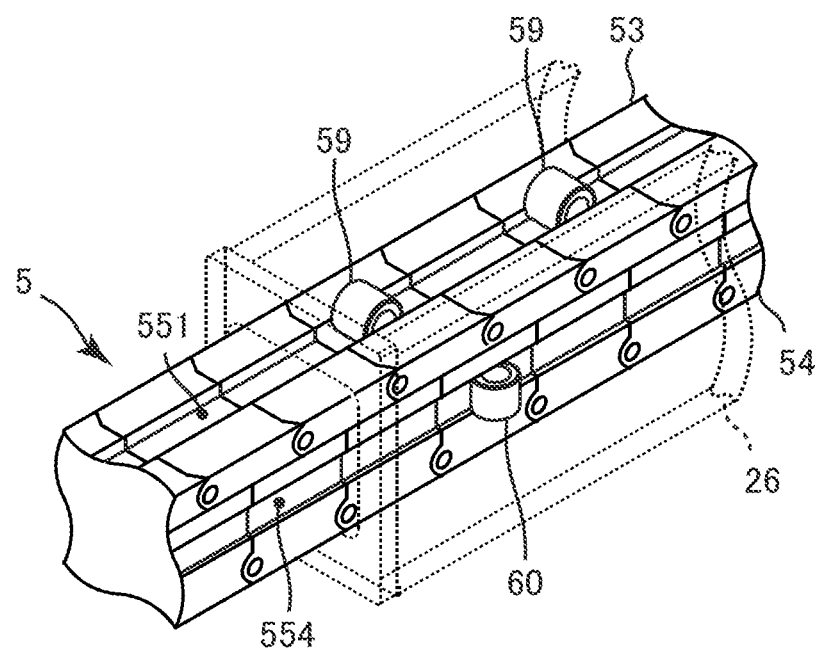
FIG. 11A is a perspective view illustrating a modification of surfaces that contact the first and second pieces of the rollers shown in FIG. 7A and FIG. 7B.
Figure 11B:
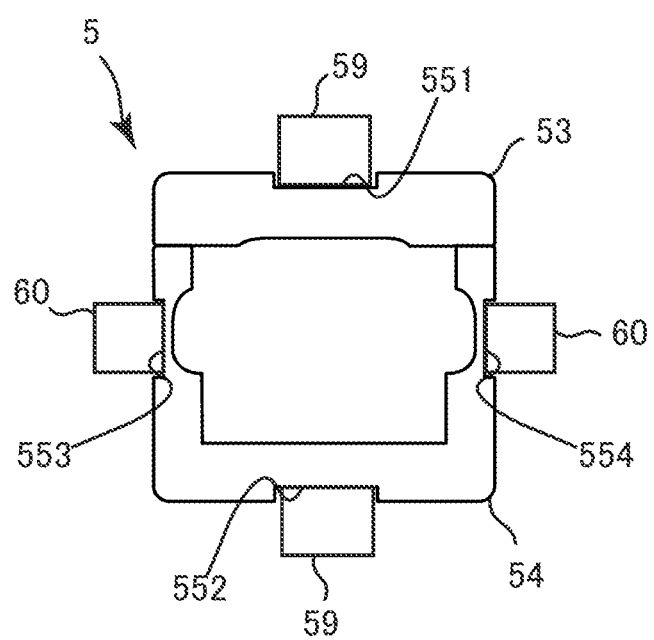
FIG. 11B is a front view illustrating the modification of the surfaces that contact the first and second pieces of the rollers shown in FIG. 7A and FIG. 7B.
Figure 12A:
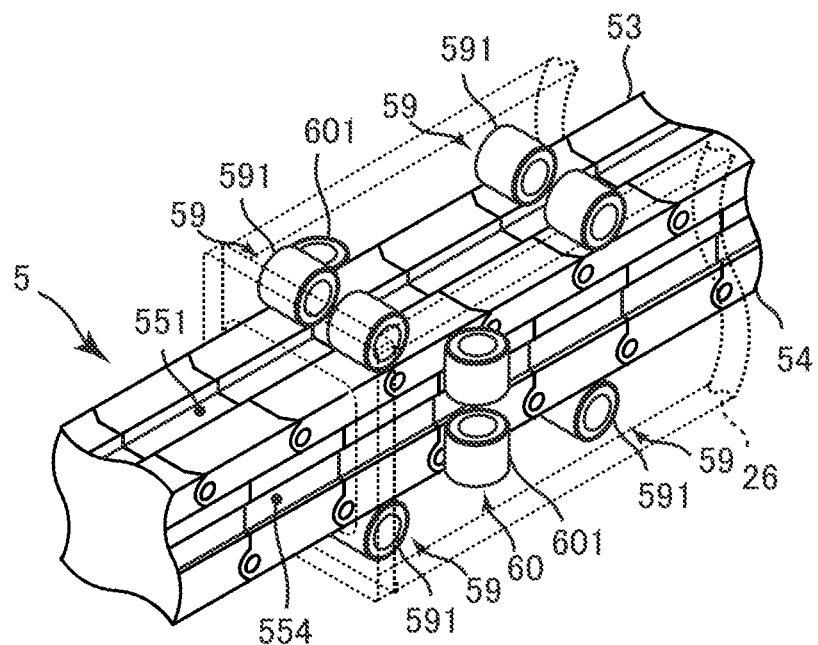
FIG. 12A is a perspective view illustrating another modification of the surfaces that contact the first and second pieces of the rollers shown in FIG. 7A and FIG. 7B.
Figure 12B:
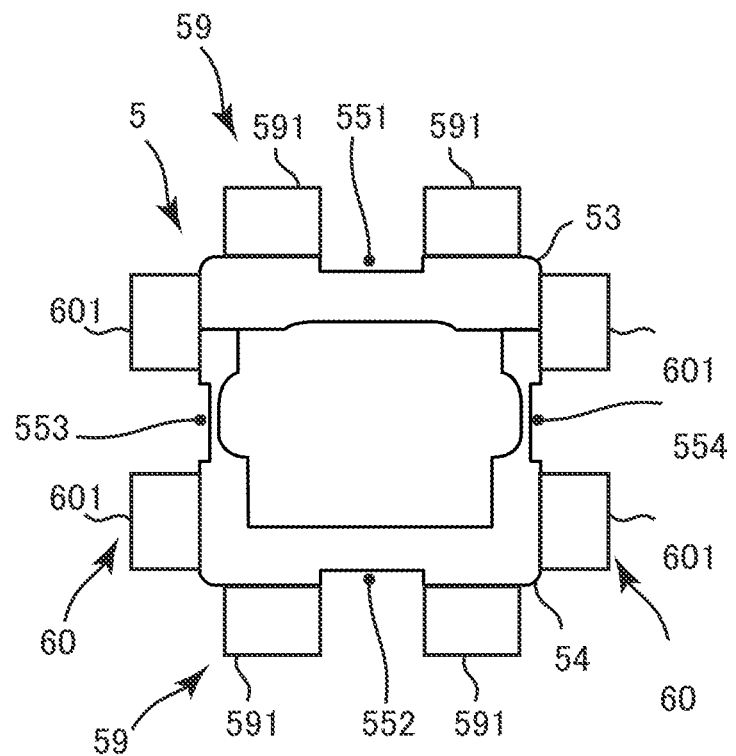
FIG. 12B is a front view illustrating the other modification of the surfaces that contact the first and second pieces of the rollers shown in FIG. 7A and FIG. 7B.
Figure 13A:
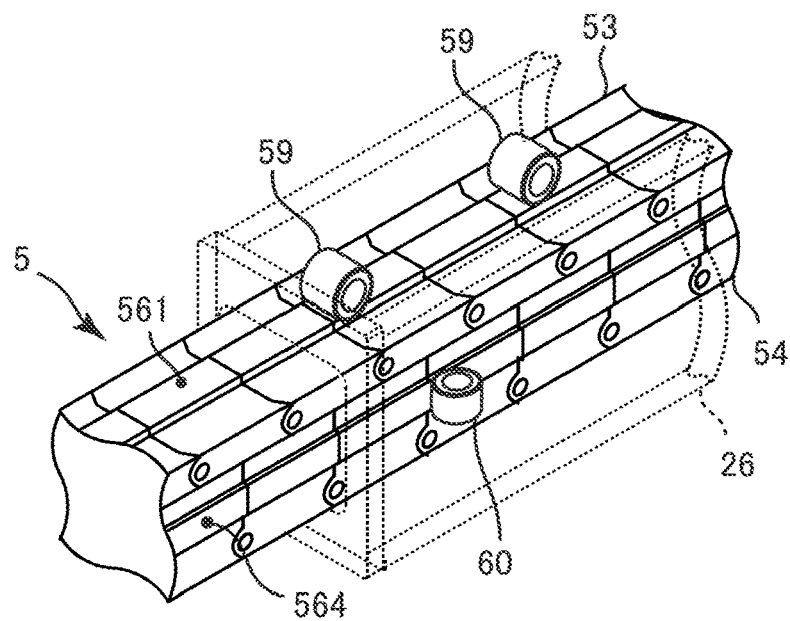
FIG. 13A is a perspective view illustrating a modification of surfaces that contact the first and second pieces of the rollers shown in FIG. 10A and FIG. 10B.
Figure 13B:
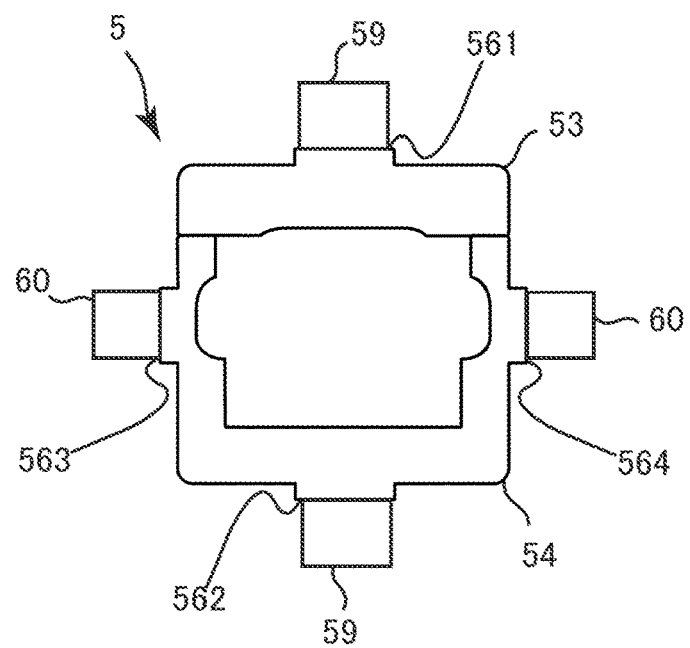
FIG. 13B is a front view illustrating the modification of the surfaces that contact the first and second pieces of the rollers shown in FIG. 10A and FIG. 10B.
Figure 14A:
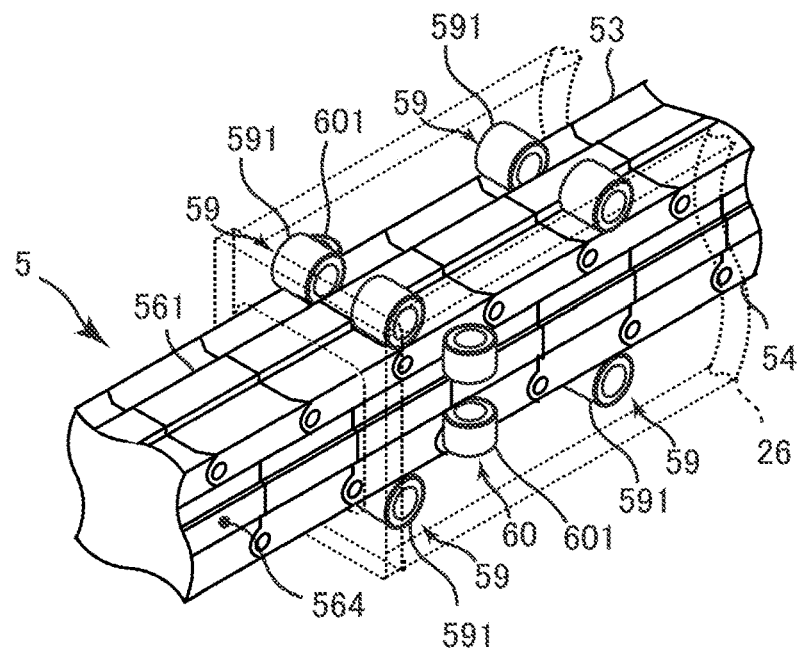
FIG. 14A is a perspective view illustrating another modification of the surfaces that contact the first and second pieces of the rollers shown in FIG. 10A and FIG. 10B.
Figure 14B:
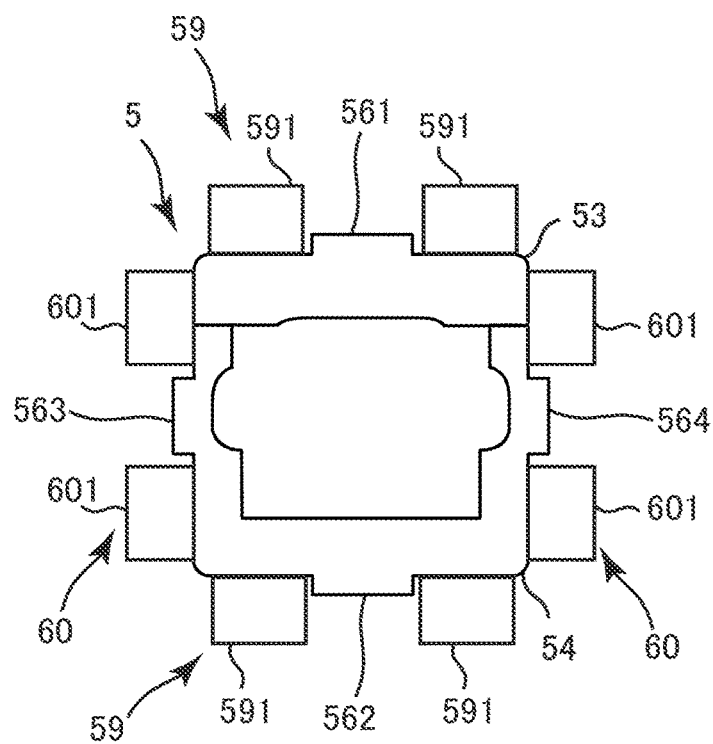
FIG. 14B is a perspective view illustrating the other modification of the surfaces that contact the first and second pieces of the rollers shown in FIG. 10A and FIG. 10B.

Note that, to decrease the area in which highly accurate machining processing for which the cost is high is required, a configuration may be adopted in which the width of at least one roller among the rollers 59 and 60 that support the arm section 5 from the top, bottom, left and right sides is made shorter than the width of the first and second pieces 53 and 54 to thereby decrease the area that comes in contact with the surfaces of the first and second pieces 53 and 54. FIG. 11A and FIG. 11B are views that illustrate the dimensions and installation positions of the rollers 59 and 60 shown in FIG. 7A and FIG. 7B. FIG. 12A and FIG. 12B are views that illustrate another example of the dimensions and installation positions of the rollers 59 and 60 shown in FIG. 7A and FIG. 7B. FIG. 13A and FIG. 13B are views that illustrate the dimensions and installation positions of the rollers 59 and 60 shown in FIG. 10A and FIG. 10B. FIG. 14A and FIG. 14B are views that illustrate another example of the dimensions and installation positions of the rollers 59 and 60 shown in FIG. 10A and FIG. 10B.

As illustrated in FIG. 11A and FIG. 11B, the width of the rolling elements of the upper and lower rollers 59 is shorter than the width of the groove sections 551 and 552. The outer peripheral surface of the respective rolling elements comes in contact with the bottom surface of the groove sections 551 and 552. Similarly, the left and right rollers 60 include rolling elements having a shorter width than the width of the groove sections 553 and 554, and are attached to the frame 26 in a condition in which the left and right rollers 60 are capable of supporting the bottom surfaces of the groove sections 553 and 554. By this means, the surfaces which the rollers 59 and 60 contact can be limited to the bottom surfaces of the groove sections 551, 552, 553 and 554, and the area for which highly accurate machining is required is decreased and thus the manufacturing cost of the first and second pieces 53 and 54 can be reduced. Further, the structure with which the upper and lower rollers 59 are fitted into the groove sections 551 and 552 limits movement in the transverse direction (width direction) of the first and second pieces 53 and 54, and the structure with which the left and right rollers 60 are fitted into the groove sections 553 and 554 limits movement in the vertical direction (thickness direction) of the first and second pieces 53 and 54, and by this means the aforementioned structures guide linear forward and rearward movement of the arm section 5.

As illustrated in FIG. 12A and FIG. 12B, the upper and lower rollers 59 each includes a plurality of, in this case, two, rolling elements 591. The two rolling elements 591 have the same diameter, and are arranged on the same axis and are separated by a distance that is approximately equal to the width of the groove sections 551 and 552. The outer peripheral surfaces of the two rolling elements 591 of each roller 59 on the upper side come in contact with two surface portions that are separated by the groove section 551 among the entire surface of the first piece 53, in other words, the outer peripheral surfaces of the aforementioned two rolling elements 591 come in contact with two surface portions which exclude the area of the groove section 551 among the entire surface of the first piece 53, respectively. The outer peripheral surfaces of the two rolling elements 591 of each roller 59 on the lower side come in contact with two surface portions that are separated by the groove section 552 among the entire surface of the second piece 54, in other words, the outer peripheral surfaces of the aforementioned two rolling elements 591 come in contact with two surface portions which exclude the area of the groove section 552 among the entire surface of the second piece 54, respectively. Similarly, each of the left and right rollers 60 includes a plurality of, in this case, two, rolling elements 601. The two rolling elements 601 have the same diameter, and are arranged on the same axis and are separated by a distance that is approximately equal to the width of the groove sections 553 and 554. The outer peripheral surfaces of the two rolling elements 601 of the roller 60 on the left side come in contact with two surface portions that are separated by the groove section 553 among the entire left side surface of the second piece 54, respectively. The outer peripheral surfaces of the two rolling elements 601 of the roller 60 on the right side come in contact with two surface portions that are separated by the groove section 554 among the entire right side surface of the second piece 54, respectively.

By this means, of the entire surfaces of the first and second pieces 53 and 54, the surfaces at which the rollers 59 and 60 come in contact with the first and second pieces 53 and 54 can be limited to only the outermost surfaces that exclude the areas of the groove sections 551, 552, 553 and 554, and thus the area for which highly accurate machining is required is decreased and the manufacturing cost of the first and second pieces 53 and 54 can be reduced.

As illustrated in FIG. 13A and FIG. 13B, the upper and lower rollers 59 each includes rolling elements having a width that is approximately equal to the width of the convex linear sections 561 and 562. The outer peripheral surfaces of the rolling elements come in contact with the top surfaces of the linear sections 561 and 562 (outermost surfaces of the first and second pieces 53 and 54). Similarly, the left and right rollers 60 each includes rolling elements having a width that is approximately equal to the width of the linear sections 563 and 564, and the outer peripheral surfaces of the rolling elements come in contact with the top surfaces of the linear sections 563 and 564 (outermost surfaces of the first and second pieces 53 and 54). By this means, of the entire surfaces of the first and second pieces 53 and 54, the surfaces at which the rollers 59 and 60 come in contact with the first and second pieces 53 and 54 can be limited to only the top surfaces of the linear sections 561, 562, 563 and 564, and thus the area for which highly accurate machining is required is decreased and the manufacturing cost of the first and second pieces 53 and 54 can be reduced.

As illustrated in FIG. 14A and FIG. 14B, the upper and lower rollers 59 each includes a plurality this case, two, rolling elements 591. The two rolling elements 591 have the same diameter, and are arranged on the same axis and are separated by a distance that is approximately equal to the width of the linear sections 561 and 562. The outer peripheral surfaces of the two rolling elements 591 of each roller 59 on the upper side come in contact with two surface portions that are separated by the linear section 561 among the entire surface of the first piece 53, in other words, the outer peripheral surfaces of the aforementioned two rolling elements 591 come in contact with two surface portions which exclude the area of the linear section 561 among the entire surface of the first piece 53, respectively. The outer peripheral surfaces of the two rolling elements 591 of each roller 59 on the lower side come in contact with two surface portions that are separated by the linear section 562 among the entire surface of the second piece 54, in other words, the outer peripheral surfaces of the aforementioned two rolling elements 591 come in contact with two surface portions excluding the area of the linear section 562 among the entire surface of the second piece 54, respectively. Similarly, each of the left and right rollers 60 includes a plurality of, in this case, two, rolling elements 601. The two rolling elements 601 have the same diameter, and are arranged on the same axis and are separated by a distance that is approximately equal to the width of the linear sections 563 and 564. The outer peripheral surfaces of the two rolling elements 601 of the roller 60 on the left side come in contact with two surface portions that are separated by the linear section 563 among the entire left side surface of the second piece 54, respectively, in other words, come in contact with two surface portions which exclude the area of the linear section 563 among the surface of the second piece 54. The outer peripheral surfaces of the two rolling elements 601 of the roller 60 on the right side come in contact with two surface portions that are separated by the linear section 564 among the entire right side surface of the second piece 54, respectively, in other words, come in contact with two surface portions which exclude the area of the linear section 564 among the surface of the second piece 54.

By this means, of the entire surfaces of the first and second pieces 53 and 54, the surfaces at which the rollers 59 and 60 come in contact with the first and second pieces 53 and 54 can be limited to only the outermost surfaces that exclude the areas of the linear sections 561, 562, 563 and 564, and thus the area for which highly accurate machining is required is decreased and the manufacturing cost of the first and second pieces 53 and 54 can be reduced.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

REFERENCE SIGNS LIST

5 . . . ARM SECTION, 26 . . . SQUARE CYLINDRICAL FRAME, 53 . . . FIRST PIECE, 54 . . . SECOND PIECE, 59 . . . UPPER AND LOWER ROLLERS, 60 . . . LEFT AND RIGHT ROLLERS, 551, 552, 553, 554 . . . GROOVE SECTION.

The invention claimed is:

1. A linear extension and retraction mechanism, comprising:
   a plurality of first pieces having a flat plate shape which are bendably connected to each other at front and rear end faces;
   a plurality of second pieces having a groove shape which are bendably connected to each other at front and rear end faces of a bottom part, with the first and second pieces becoming linearly rigid when superposed on each other, and the first and second pieces returning to a bent state when separated from each other;
   a head section configured to bundle a leading first piece of the plurality of first pieces and a leading second piece of the plurality of second pieces; and
   a sending-out mechanism section including a plurality of rollers for firmly superposing the first and second pieces and supporting the first and second pieces movably to front and rear;
   wherein a groove section that extends from front to rear is formed respectively in each of surfaces of the first and second pieces on sides that come in contact with the rollers.

2. The linear extension and retraction mechanism according to claim 1, wherein the groove section is formed in each of a top surface of the first piece and a bottom surface of the second piece.

3. The linear extension and retraction mechanism according to claim 2, wherein the groove section is formed in each of two side surfaces of the second piece.

4. The linear extension and retraction mechanism according to claim 2, wherein the groove section is formed at a width center in the top surface of the first piece.

5. The linear extension and retraction mechanism according to claim 2, wherein the groove section is formed at a width center in the bottom surface of the second piece.

6. The linear extension and retraction mechanism according to claim 1, wherein outer peripheral surfaces of rolling elements of the rollers contact surface portions excluding the groove section formed in each of the surfaces of the first and second pieces.

7. The linear extension and retraction mechanism according to claim 1, wherein:
   the roller has a plurality of rolling elements which are coaxially arranged at a distance from each other; and
   outer peripheral surfaces of the plurality of rolling elements contact a plurality of surface portions excluding the groove section formed in each of the surfaces of the first and second pieces, respectively.

8. A linear extension and retraction mechanism, comprising:
   a plurality of first pieces having a flat plate shape which are bendably connected to each other at front and rear end faces;
   a plurality of second pieces having a groove shape which are bendably connected to each other at front and rear end faces of a bottom part, with the first and second pieces becoming linearly rigid when superposed, and the first and second pieces returning to a bent state when separated from each other;
   a head section configured to bundle a leading first piece of the plurality of first pieces and a leading second piece of the plurality of second pieces; and
   a sending-out mechanism section including a plurality of rollers for firmly superposing the first and second pieces and supporting the first and second pieces movably to front and rear;
   wherein a convex linear section that extends from front to rear is formed on each of surfaces of the first and second pieces on sides that come in contact with the rollers.

9. The linear extension and retraction mechanism according to claim 8, wherein the linear section is formed on each of a top surface of the first piece and a bottom surface of the second piece.

10. The linear extension and retraction mechanism according to claim 9, wherein the linear section is formed on each of two side surfaces of the second piece.

11. The linear extension and retraction mechanism according to claim 9, wherein the linear section is formed at a width center of the top surface of the second piece.

12. The linear extension and retraction mechanism according to claim 9, wherein the linear section is formed at a width center of the bottom surface of the second piece.

13. The linear extension and retraction mechanism according to claim 9, wherein outer peripheral surfaces of rolling elements of the rollers contact surface portions excluding the linear section of surfaces of the first and second pieces.

14. The linear extension and retraction mechanism according to claim 9, wherein:

the roller has a plurality of rolling elements which are coaxially arranged at a distance from each other; and outer peripheral surfaces of the plurality of rolling elements contact a plurality of surface portions excluding the linear section of surfaces of the first and second pieces, respectively.

15. A linear extension and retraction mechanism, comprising:

a plurality of first pieces having a flat plate shape which are bendably connected to each other at front and rear end faces;

a plurality of second pieces having a groove shape which are bendably connected to each other at front and rear end faces of a bottom part, with the first and second pieces becoming linearly rigid when superposed, and the first and second pieces returning to a bent state when separated from each other;

a head section configured to bundle a leading first piece of the plurality of first pieces and a leading second piece of the plurality of second pieces; and a sending-out mechanism section including a plurality of rollers for firmly superposing the first and second pieces and supporting the first and second pieces movably to front and rear;

wherein a width of each of the rollers is shorter than a width of the first and second pieces.

\* \* \* \* \*